US011846928B2

(12) United States Patent
Geisen

(10) Patent No.: US 11,846,928 B2
(45) Date of Patent: Dec. 19, 2023

(54) METHOD FOR IRRADIATING A POWDER LAYER IN ADDITIVE PRODUCTION USING CONTINUOUSLY DEFINED PRODUCTION PARAMETERS

(71) Applicant: Siemens Energy Global GmbH & Co. KG, Munich (DE)

(72) Inventor: Ole Geisen, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 177 days.

(21) Appl. No.: 16/641,727

(22) PCT Filed: Sep. 18, 2018

(86) PCT No.: PCT/EP2018/075154
§ 371 (c)(1),
(2) Date: Feb. 25, 2020

(87) PCT Pub. No.: WO2019/068455
PCT Pub. Date: Apr. 11, 2019

(65) Prior Publication Data
US 2020/0353679 A1    Nov. 12, 2020

(30) Foreign Application Priority Data
Oct. 2, 2017    (EP) .................................... 17194340

(51) Int. Cl.
*B29C 64/364* (2017.01)
*B29C 64/153* (2017.01)
(Continued)

(52) U.S. Cl.
CPC ........ *G05B 19/4099* (2013.01); *B22F 10/385* (2021.01); *B29C 64/153* (2017.08);
(Continued)

(58) Field of Classification Search
CPC ... B29C 64/386; B29C 64/393; B29C 64/153; B29C 64/268; B29C 64/364;
(Continued)

(56) References Cited

U.S. PATENT DOCUMENTS 10,583,485 B2 * 3/2020 Griffith .................. B33Y 50/02
2007/0175875 A1 8/2007 Uckelmann et al.
(Continued)

FOREIGN PATENT DOCUMENTS

CN      101752074 A    6/2010
CN      104001917 A    8/2014
(Continued)

OTHER PUBLICATIONS

PCT International Search Report and Written Opinion of International Searching Authority dated Jan. 8, 2019 corresponding to PCT International Application No. PCT/EP2018/075154 filed Sep. 18, 2018.

*Primary Examiner* — Philip C Tucker
*Assistant Examiner* — Jimmy R Smith, Jr.

(57) ABSTRACT

A method for providing data for selectively irradiating a powder layer in additive production, the method includes: providing a predefined component geometry for a component; dividing the component geometry into at least one first component layer and an overlying second component layer for additive production, wherein a contour of the second component layer is incongruent with a contour of the first component layer; and continuously defining at least one production parameter for additively producing the second component layer in region of a molten bath of a contour of the first component layer. A corresponding component is produced and a computer program product implements the method.

10 Claims, 3 Drawing Sheets

(51) Int. Cl.
| | |
|---|---|
| *B29C 64/393* | (2017.01) |
| *B29C 64/268* | (2017.01) |
| *B22F 10/38* | (2021.01) |
| *B33Y 10/00* | (2015.01) |
| *B33Y 50/02* | (2015.01) |
| *B22F 10/28* | (2021.01) |
| *G05B 19/4099* | (2006.01) |

(52) U.S. Cl.
CPC .......... *B29C 64/268* (2017.08); *B29C 64/364* (2017.08); *B29C 64/393* (2017.08); *B22F 10/28* (2021.01); *B33Y 10/00* (2014.12); *B33Y 50/02* (2014.12)

(58) Field of Classification Search
CPC ......... B33Y 50/02; B33Y 10/00; B33Y 50/00; B22F 3/1055; B22F 2003/1056; B22F 2003/1057; B22F 2003/1058; B22F 2003/1059; B22F 10/20; B22F 10/28; B22F 10/385
See application file for complete search history.

(56) References Cited

U.S. PATENT DOCUMENTS

| | | |
|---|---|---|
| 2014/0238559 A1 | 8/2014 | Angal et al. |
| 2016/0167131 A1 | 6/2016 | Weilhammer et al. |
| 2016/0240003 A1* | 8/2016 | Frayne .................. B29C 64/364 |
| 2018/0229302 A1* | 8/2018 | Furrer .................. B29C 64/153 |
| 2018/0229303 A1* | 8/2018 | Burlatsky ............. B33Y 10/00 |

FOREIGN PATENT DOCUMENTS

| | | |
|---|---|---|
| CN | 105026581 A | 11/2015 |
| DE | 102014206358 A1 | 10/2015 |
| EP | 2601006 B1 | 6/2014 |
| WO | 2018210436 A1 | 11/2018 |

* cited by examiner

METHOD FOR IRRADIATING A POWDER LAYER IN ADDITIVE PRODUCTION USING CONTINUOUSLY DEFINED PRODUCTION PARAMETERS

CROSS REFERENCE TO RELATED APPLICATIONS

This application is the US National Stage of International Application No. PCT/EP2018/075154 filed 18 Sep. 2018, and claims the benefit thereof. The International Application claims the benefit of European Application No. EP17194340 filed 2 Oct. 2017. All of the applications are incorporated by reference herein in their entirety.

FIELD OF INVENTION

The present invention relates to a method for, or as part of, an additive production method. The invention relates, in particular, to the provision of data or information for the selective irradiation of a powder layer in additive production.

The present invention also relates to a corresponding additive production method and to a component produced according to this method. Furthermore, the present invention relates to a computer program, or computer program product, and to a corresponding computer-readable medium.

BACKGROUND OF INVENTION

Generative or additive methods for the production of components comprise, for example, as powder bed method methods selective laser melting (SLM) or laser sintering (SLS), or electron beam melting (EBM).

Additive methods likewise include laser deposition welding (LMD).

A method for selective laser melting is known, for example, from EP 2 601 006 B1.

Additive manufacturing methods have proven particularly advantageous for complex or complicatedly or filigree-designed components, example labyrinth-like structures, cooling structures and/or lightweight structures. In particular, additive manufacture is advantageous because of a particularly short chain of process steps, since a step of production or manufacture of a component can be carried out directly on the basis of a corresponding CAD file.

Furthermore, additive manufacture has hitherto been particularly advantageous for the development or production of prototypes which, for example, cannot be produced, or cannot be produced efficiently, by means of conventional subtractive or machining methods or casting technology.

The component as described here is preferably intended for use in a turbomachine, for example in the hot-gas path of a gas turbine. The component preferably consists of a nickel-based alloy or superalloy, in particular a nickel-based or cobalt-based superalloy, or comprises such an alloy. The alloy may furthermore preferably be precipitation-hardened, oxidation-hardened and/or dispersion-hardened.

Additive production requires the selective irradiation of a powder layer with preferably predefined irradiation or production parameters. The corresponding parameters must at least sometimes be selected as a function of the geometry of the component. Depending on whether an edge region or a contour of the component or for the component is currently being irradiated, or an inner-lying region, the parameters are to be varied with a view to an optimal material structure—for example surface quality, hot-crack susceptibility—of the component. This is the case, in particular, since a thermal input into or a thermal dissipation from a melt bath during the additive production are dependent on the current (lateral) position of the region to be solidified or of the corresponding layer.

In addition, particularly those production parameters which are to be selected for the production or irradiation of a contour of the component, must be specifically adapted according to whether the new component layer, or the component layer currently to be solidified, is supported by an underlying (constructed or produced) structure or, for example, projects or overhangs beyond it laterally. Despite a certain "design freedom", for example of selective melting methods, the additive production of overhanging structures of the described components is known to represent a great challenge. Overhanging regions of the component, particularly those with an overhang angle of more than 45°, for example, can be produced only with extreme difficulty or not at all by means of SLM or EBM.

In particular, owing to the geometry, the component contour of a constructed layer and/or a layer to be solidified for the component often contains so-called "downskin" regions or overhangs, together with "upskin" regions, which are supported by an underlying layer. A component contour in an upskin region comprises preferably vertical walls or contours, which for example extend parallel to the construction direction of the component.

Depending on precisely which contour the component is intended to have according to its geometry, different production or irradiation parameters are correspondingly assigned.

The aforementioned parameters in the present case preferably characterize so-called vectors for the irradiation of the component, or an irradiation or exposure trajectory, or a corresponding path along which an energy beam, for example a laser beam, is guided over the powder bed in order to solidify a corresponding starting powder selectively and according to the desired geometry of component. The energy beam may in this case be guided over the powder bed in a meandering fashion in order to remelt and solidify an area that is as large as possible. Individual irradiation paths which may belong to the vector are in this case separated from one another only slightly, so that a melt bath reaches the entire powder bed area to be melted, optionally in such a way that a neighboring already solidified path or track is at least partially remelted. In addition to the irradiation of a component layer in the interior, as described above contour irradiation at the edge of the respective layer is necessary or advantageous.

Conventionally, the various vectors (for example "downskin" or "upskin") are provided with their own parameters. This leads to an unfavorably interrupted, intermittent or discontinuous contour irradiation and therefore inefficiently long process or construction times, and additionally to instabilities in the melt bath during the powder solidification, since for example repeated "ignition", "approaching" and/or alignment of the irradiation apparatus required for the solidification is necessary upon each interruption or change in the irradiation path.

SUMMARY OF INVENTION

It is therefore an object of the present invention to provide means which solve the described difficulties or problems, and in particular decisively improve the structural quality of additively produced components.

This object is achieved by the subject matter of the independent patent claims. The dependent patent claims relate to advantageous configurations.

One aspect of the present invention relates to a method for providing data or information for the selective irradiation of a powder layer in additive production, comprising the provision of a predefined component geometry, for example in the form of a CAD file, for the component.

The method furthermore comprises subdivision of the component geometry into at least a first component layer and a second component layer lying thereon for the additive production, a contour of the second component layer being nonidentical to or incongruent with a contour of the first component layer. In other words, there is at least one "upskin" or "downskin" region.

The method furthermore comprises continuous or constant definition of at least one production parameter for additive production of the second component layer in the region of a melt bath, or of a thermally affected zone, for example of a contour of the first (underlying) component layer. In other words, the parameter is advantageously defined continuously or constantly in those regions where the contours (of the first and second component layers) overlap the width of the melt bath.

The aforementioned method is advantageously a computer-implemented method. This is intended to mean that at least some method steps described in this context are partially or fully carried out by general means for data processing. Advantageously, the method steps of subdividing the component geometry and continuously defining the at least one production parameter (as described) are partially or fully carried out by means for data processing. The provision of the component geometry may in this case, for example, also be carried out by means other than those belonging to the data processing, for example by fully or partially user-controlled loading of a CAD file or other information or data, or by manual input.

The expression "computer-implemented method" is, in particular, not intended to mean that all method steps must be carried out fully by general means for data processing.

The described invention, in particular the aforementioned method, makes possible a higher process productivity by more rapid exposure of the contour without interruptions. Furthermore, the described method allows the construction of components with a lower defect or crack-center density. Since edges of the melt bath are usually unstable during additive production in respect of their solidification or reaction kinetics, the continuous definition of the parameters allows a decisive improvement or amelioration of the melt-bath kinetics by fluid transitions in the contour irradiation and all the production parameters. The risk of crack and/or defect formation during additive production is therefore decisively reduced. This means, in particular, groundbreaking advantages in the additive production of component parts exposed to high temperatures, for example of gas turbines.

Furthermore, with the described means, the surface quality of the components, also including inner-lying surfaces, is decisively improved.

In other words, a capability is provided of making additive production reproducible and/or actually usable for mass production of component parts exposed to high temperatures.

A further aspect of the present invention relates to a method for the additive production of the component from a powder bed, comprising the selective irradiation according to the method described above, wherein the component is irradiated with an energy beam—advantageously a laser—or electron beam, and/or additively produced, according to the continuously defined production parameters A further aspect of the present invention relates to a component which is producible or produced according to the described production method, comprising, in comparison with a conventional component (of the prior art), a lower density of defects, crack centers and/or a lower likelihood of the formation of defects or hot cracks. In this way, the component may advantageously be produced more reproducibly and with an improved structure and dimensional compliance.

A further aspect of the present invention relates to a computer program, or computer program product, comprising instructions which, when the program is run by a data processing device (computer), cause the latter to carry out the method for providing data for the selective irradiation.

A further aspect of the present invention relates to computer program product comprising the data for the selective irradiation of the powder layer, which are provided by the method for providing the corresponding data or information for the selective irradiation, or are obtained from the described computer program.

A further aspect of the present invention relates to a computer-readable medium or storage medium comprising instructions which, when run by a data processing device, cause the latter to carry out the method for providing data for the selective irradiation. The described computer program may be stored on the computer-readable medium.

In one configuration, the production parameter denotes or comprises a geometry of a contour irradiation pattern for the additive production of the component. According to this configuration, the melt bath, which is generated—for example by selective laser melting—during the selective irradiation of the powder bed to solidify a starting material, is advantageously guided stably and continuously over the powder bed. It is an advantage that the melt bath is not abruptly interrupted, so that the described instabilities can be prevented.

In one configuration, the production parameter denotes or comprises a contour production parameter.

In one configuration, the production parameter denotes or comprises at least one irradiation parameter or beam property for the additive production of the component, for example a parameter selected from: radiation intensity, energy density, radiation power, radiation power density, polarization, pulsation and irradiation wavelength. The irradiation wavelength may be a laser wavelength or—in the case of a particle beam—a de Broglie wavelength. According to this configuration, in addition to the described advantages of the previous configuration, the total additive construction process may be carried out continuously with the aid of the irradiation parameters, i.e. for example without inconstancies or discontinuities.

In one configuration, the production parameter denotes or comprises a contour irradiation parameter.

In one configuration, the continuous definition comprises a multiplicity of production parameters, comprising at least one parameter selected from: thermal input, melt bath width, beam offset, irradiation speed, size of a beam cross section on the powder bed, irradiation angle, flow rate or flow speed of a protective gas flow, states of gas valves regulating the protective gas flow, ambient pressure and alloy composition of a powder. According to this configuration, all parameters to be selected or selectable for the additive construction of the component may particularly advantageously be defined or adapted continuously. The number of parameters may regularly exceed 100.

In one configuration, the second component layer comprises a region overhanging or protruding beyond the first component layer.

In one configuration, overhang production parameters, for example differing from a standard production parameter set (for example for 90° contours or 90° walls), are assigned to the overhanging region.

In one configuration, the second component layer comprises a supported region, which lies inside the contour of the first component layer and, for example, is separated therefrom.

In one configuration, support production parameters, for example differing from the standard production parameter set, are assigned to the supported region.

In one configuration, the component geometry is subdivided into a multiplicity of component layers arranged above one another, for example in a number of between 1000 and 10000 component layers.

In one configuration, production parameters of at least some of these component layers are defined continuously in the region of a melt bath, or of a thermally affected zone, of a contour of a respectively underlying component layer.

In one configuration, the method is or comprises a CAM method for preparing the additive production of the component.

Configurations, features and/or advantages which relate here to the method for providing data for the selective irradiation may furthermore apply to the additive production method, to the component, to the computer program (product) or to the computer-readable medium, and vice versa.

BRIEF DESCRIPTION OF THE DRAWINGS

Further details of the invention will be described below with the aid of figures.

DETAILED DESCRIPTION OF INVENTION

In the exemplary embodiments and figures, elements which are the same or have the same effect may respectively be provided with the same references. The elements represented and their size proportions with respect to one another are not in principle to be regarded as true to scale; rather, individual elements may be represented exaggeratedly thick or largely dimensioned for better representability and/or for better comprehensibility.

Figure 1:
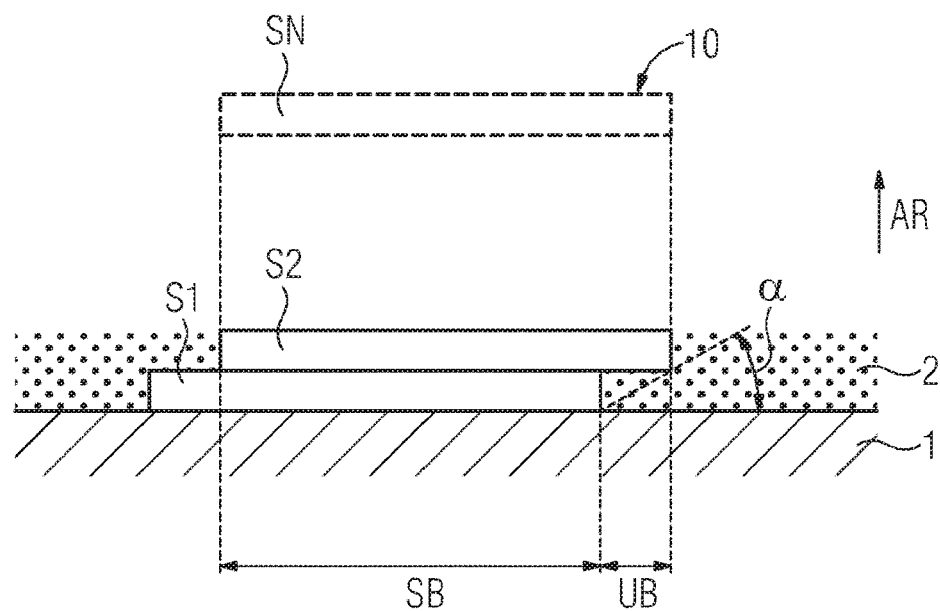
FIG. 1 shows a schematic sectional view of a part of a component during its additive production.

FIG. 1 shows a schematic sectional or side view of at least one part of a component 10 to be additively produced. The component 10 is advantageously indicated during its additive, generative or layerwise production, a first layer S1 and a second layer S2, arranged above the first layer along a construction direction AR, already having been selectively irradiated from an irradiation device (not explicitly shown) and accordingly solidified and produced.

The solidification, for example by a laser or electron beam (cf. SLM and EBM methods) is advantageously carried out by selective solidification of a base material from a powder bed 2. The first layer S1 is in this case connected or welded with a material fit to an underlying substrate or construction platform 1. This is done by scanning the starting material or the powder bed 2, for example line-wise or in a meandering shape, with the energy beam, for example a laser beam. In this case, a melt bath is guided with the beam over the surface of the powder bed, which bath immediately solidifies to form a newly constructed component layer after the laser has passed by.

The finished component 10 advantageously comprises the layers S1, S2 and all further layers to be constructed thereon, as far as layer SN (denoted by dashes).

The component is advantageously a component exposed to high temperatures, used in the hot-gas path of a gas turbine. Accordingly, particular requirements are already placed on the starting material forming the powder bed 2. The starting material advantageously denotes a precipitation-hardened and particularly refractory—and difficult to weld because of its because of its crack susceptibility—superalloy, for example a nickel-based alloy. The melting/welding with the least possible defects, which is required for the additive construction, even with simple geometries, because of the high temperature gradients and complicated reaction kinetics involved in the additive construction process, represents a particular challenge and one of the decisive restrictions in the establishment of additively produced component parts exposable to high temperatures.

A further difficulty arises when complicated component geometries are additionally to be achieved in additive production.

The layer S1 is advantageously coated in the scope of an SLM or EBM process with a further layer of powder or starting material, which has subsequently been irradiated and solidified in the form of the layer S2 according to the geometry of the component.

In the present case, the geometry of the component 10 requires that the layer S2 protrude laterally at the edge of the component 10 (not explicitly denoted) beyond the layer S1 in an overhanging region or overhang region UB.

Since an angle α of less than 45° (cf. FIG. 1) of an overhanging region cannot be produced, or can be produced only with great difficulty, during the additive production of the striped component parts, the overhanging region UB is small or narrow, for example in comparison with a supported or supporting region SB in which the layer S2 is fully supported by the layer S1. The overhanging region UB is accordingly to be constructed or irradiated, for example, at the right-hand edge of the component 10 in FIG. 1 with different production parameters or irradiation parameters than the left-hand edge of the component, which is fully supported by the layer S1.

Figure 2:
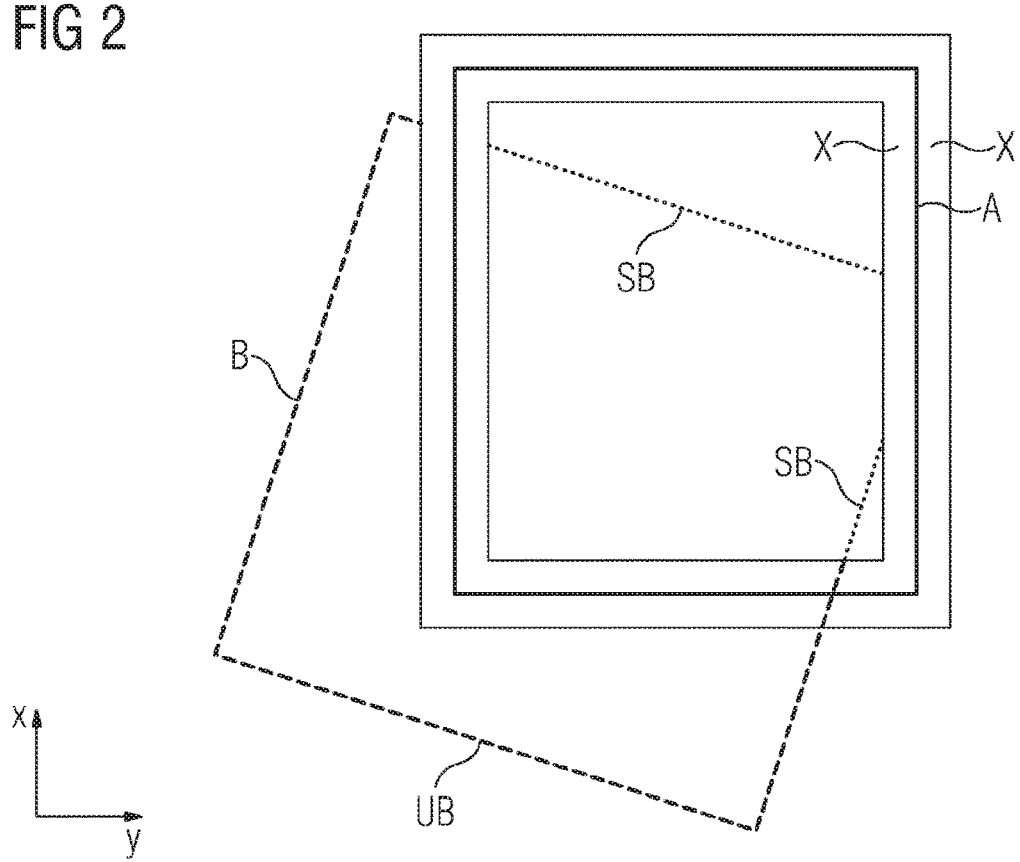
FIG. 2 shows a schematic plan view of at least one part of a component, with the aid of which the selective irradiation for the additive production of the component is indicated.

FIG. 2 indicates, in a plan view of the component described in FIG. 1, or an individual component layer, an irradiation pattern or contour irradiation vectors for the additive construction of the component 10.

The line A indicates a contour of the first layer S1.

The dashed line B, on the other hand, indicates a contour of the second layer S2 lying over the first layer. The second layer S2 is thus nonidentical to the first layer S1, or incongruent therewith. In the plan view of FIG. 2, however, there are regions which overlap, so that the layer 2, as indicated by the contour B, describes supported as well as overhanging regions. In other words, the contour B relative to the contour A defines the geometrical variation of the component 10 along a construction direction AR (out of the plane of the paper as seen in FIG. 2).

At a constant distance from the line A, with a similar profile as the contour A, a region X of the melt bath during the additive production, or of a thermally affected zone that need not necessarily be fully melted, is indicated. In the region X of the melt bath, the contour or line B is shown as interrupted, which is intended to indicate that there are conventionally interruptions or inconstancies in some production parameters in this region X. This has negative repercussions on the structure of the component 10.

In the above-described supported or supporting region SB, the line B is shown as dotted, which is intended to indicate that the layer S2 is fully carried by the layer S1 in this region.

Conversely, the contour B is marked as dashed in an overhanging region UB (of the layer S2 relative to the layer S1).

Production parameters, for example irradiation parameters, are standardly selected differently depending on whether an overhang contour (cf. UB), a standard contour or standard wall (not explicitly marked) or a fully supported region (cf. SB) is intended to be irradiated.

The aforementioned production parameters may additionally, as irradiation parameters, relate for example to a radiation intensity, energy density, radiation power, radiation power density, polarization, pulsation or an irradiation wavelength. Accordingly, a magnitude of one of the parameters described may, for example, be selected to be greater or less in the overhanging region than the magnitude of the same parameter in the supported region, in order to obtain an optimal structural or surface quality of the component 10. The optimal adjustment of these or other parameters is very sensitive since, for example, a radiation power selected to be too large or too small may even locally lead to a greatly increased density of defects, porosities or crack centers or "crack seeds".

As an alternative or in addition to the quantities described, a production parameter may denote specific parameters of an additive production system (not explicitly marked) in general, for example thermal input, melt bath width, beam offset, irradiation speed, size of a beam cross section on the powder bed, irradiation angle, flow rate or flow speed of a protective gas flow, states of gas valves regulating the protective gas flow, ambient pressure or even an alloy composition of a powder. The number of parameters which is required in order to describe an additive production process sufficiently comprehensively, or reproducibly, may readily exceed the number 100, as illustrated with the aid of the examples described above. Each of these quantities may in the present case be regarded as a production parameter.

The solid regions or sections of the contour B, i.e. in the regions X, which intersect or cross the melt bath of the underlying layer S1, or its edge contour, consequently describe an abrupt step in the irradiation pattern and therefore also in all production parameters.

Figure 3:
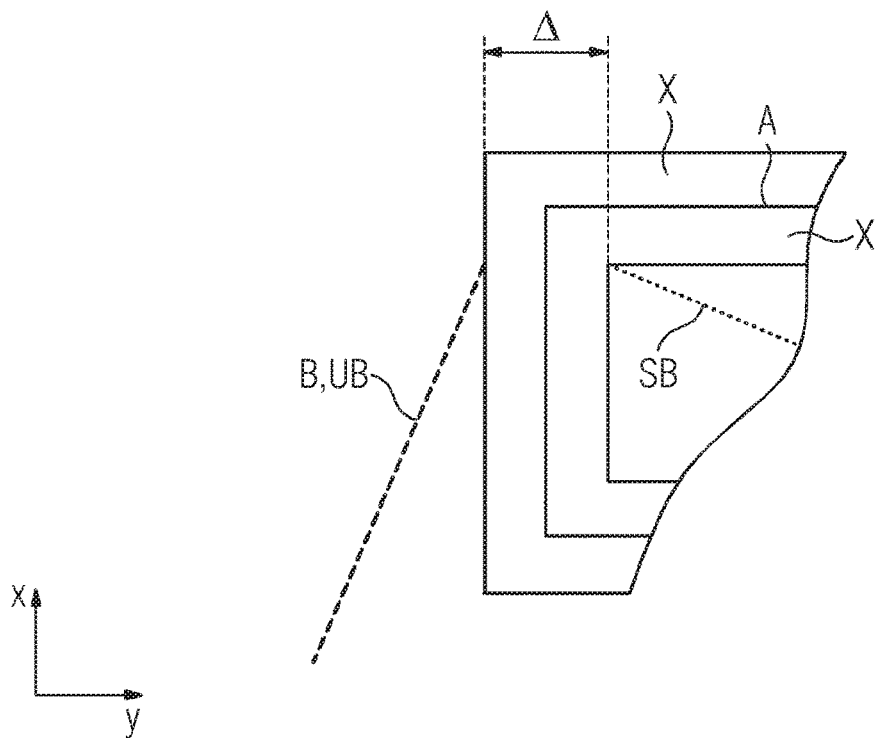
FIG. 3 shows a detailed view of a region of the plan view of FIG. 2.

FIG. 3 shows a detailed view of the plan view of FIG. 2 (upper left corner). It may be seen that a jump occurs in the contour B (represented as solid in FIG. 2), and consequently of course also in the corresponding irradiation and production parameters, in the region of the melt bath, or of the thermally affected zone, which in the present case has a width Δ of 500 μm or less, for example 200 μm.

This jump leads to unfavorable structural results of the component 10, in particular of the layer S2, since neither the contour nor the production or coating parameters to be selected over the region X are defined continuously.

The aforementioned jump, or the inconstancy, in the contour irradiation or the corresponding production parameters advantageously occurs, as indicated in FIG. 3, in the region X of the layer S1, i.e. that region which for the layer S2 separates the overhanging region UB from the supporting region SB.

Figure 4:
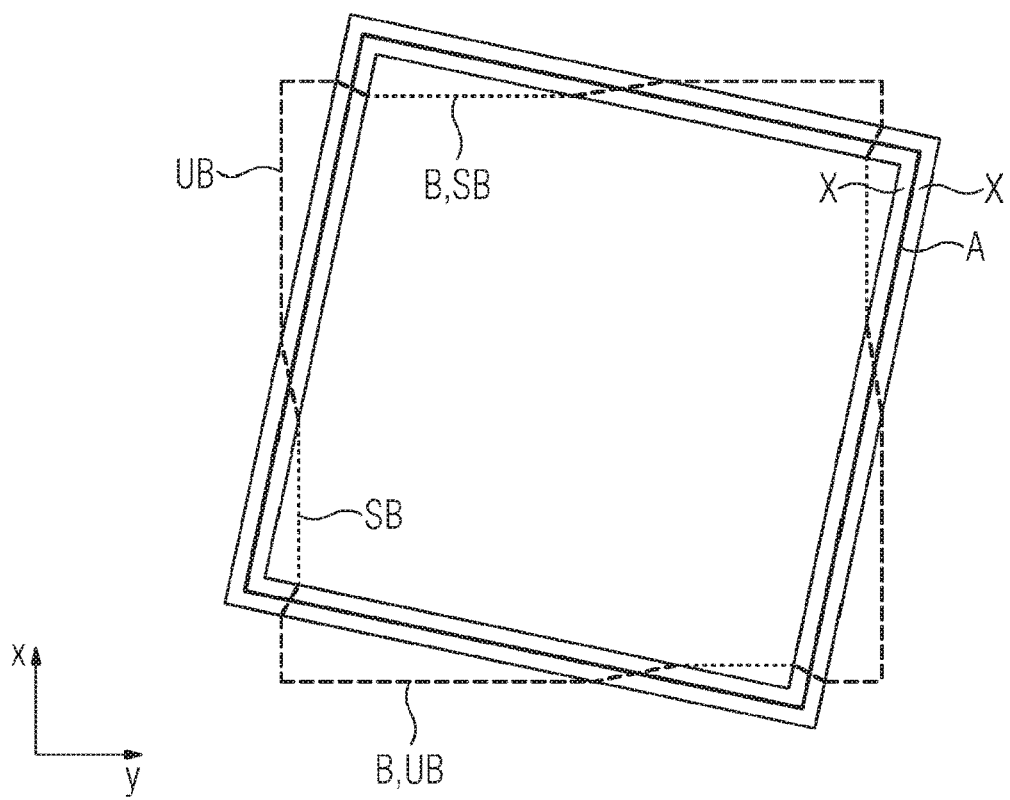
FIG. 4 shows a schematic plan view similar to FIG. 2, with the aid of which method steps according to the invention are indicated.

FIG. 4 shows a situation comparable to that of FIG. 2, but in which method steps according to the invention have been applied in order to prevent the described inconstancy and the concomitant disadvantages. In FIG. 4, the contour A is again shown with its surrounding region X (slightly rotated to the right in comparison with FIG. 2). The contour B is likewise shown as dashed in at least a similar way as in FIG. 2. In the overhanging region UB and the supporting or supported region SB, the irradiation together with the corresponding production parameters advantageously behave as in FIG. 2 or as known in the prior art. In the regions X in which—as may be seen with the aid of FIG. 3—a jump conventionally takes place in the contour irradiation, and therefore also an inconstancy in the magnitudes of the production parameters, a continuous transition in the contour B is now shown. According to the method according to the invention, a specific irradiation vector (contour irradiation) is thus now defined in the region of the melt bath of the contour of an underlying layer (cf. layer S1).

In addition, because of the continuously defined irradiation vector existing this region, not only irradiation vectors, for example the radiation power density, irradiation wavelength or laser power, but also all production parameters described above, may for example be defined or adapted gradually and constantly, according to which parameters the component 10 is finally constructed in order to use the advantages according to the invention. The (gradual) adaptation is advantageously (but not necessarily) carried out directly on those parameters of the corresponding layer to be constructed above (cf. layer S2) which are selected in the overhanging region UB and the supporting region SN.

This has, in contrast to jumps or inconstancies in the contour irradiation and the corresponding production parameters, decisive advantages for the additive process, for example a higher productivity because of more rapid exposure of the contour without interruptions, fewer defects or crack centers, since a "start" and "end" of the melt bath (cf. region X) can be guided no longer unstably but continuously and stably. Consequences are again an improved structure, surface quality and improved dimensional compliance for the component 10.

As indicated with the aid of FIG. 1, the method according to the invention for the additive production of the component 10 comprises subdivision of a corresponding component geometry into a multiplicity of layers S1, S2 up to SN, arranged above one another. This may correspond to a number of between 1000 and 10000 component layers, production parameters HP of at least some of these component layers being defined continuously in the region X of the melt bath of a contour of a respectively underlying component layer S1, as described.

The finally produced component 10 advantageously comprises a lower density of defects, crack centers and/or a lower likelihood of the formation of defects or hot cracks, in comparison with a component of the prior art or a conventionally produced component.

Figure 5:
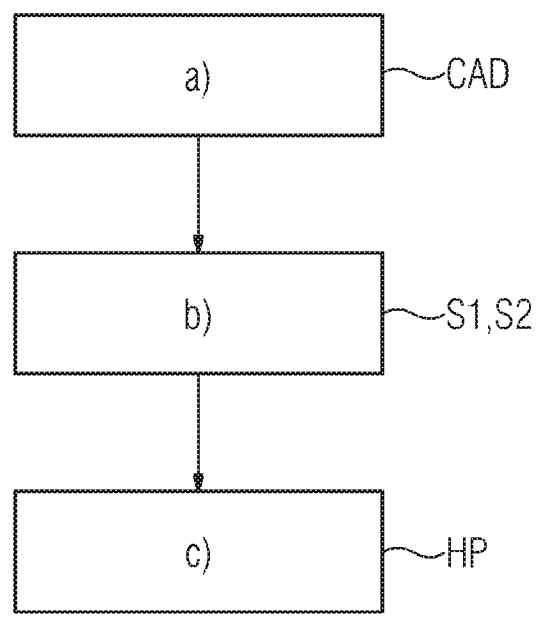
FIG. 5 shows a schematic flowchart which indicates method steps according to the invention.

FIG. 5 indicates method steps of the method according to the invention with the aid of a schematic flowchart:

The method is advantageously a method for providing data for the selected irradiation of a powder bed in additive production. In this sense, the method according to the invention advantageously describes a part of an additive production method itself. The method comprises a) providing a predefined component geometry for the component 10 (see layers S1, S2 up to SN in FIG. 1). The component geometry is advantageously specified by a CAD file or corresponding design data. As an alternative thereto, the component geometry may be provided by digitized measurement of an already existing component 10.

The method comprises, b), furthermore subdividing the component geometry 10 into at least a first component layer S1 and a second component layer S2 lying thereon for the additive production, a contour B of the second component layer S2 being nonidentical to a contour A of the first component layer S1 (see above). The subdivision, including the subsequent method steps, is advantageously to be regarded as part of a CAM method for preparing for the additive production of the component 10.

The method furthermore comprises c) continuously defining at least one production parameter HP for additive production of the second component layer S2 in the region X of a melt bath of a contour A of the first component layer S1, as described above.

Accordingly, in principle all described method steps, optionally except for the actual physical construction of the component itself, may be carried out by means of data processing, for example a data processing device or computer.

The description with the aid of the exemplary embodiments does not restrict the invention to these exemplary embodiments; rather, the invention comprises any new feature and any combination of features. This includes in particular any combination of features in the patent claims, even if this feature or this combination per se is not specifically indicated in the patent claims or exemplary embodiments.

The invention claimed is:

1. A computer-implemented method for providing data for the selective irradiation of a powder layer in additive production, comprising:
    a) providing a predefined component geometry for a component to a processor;
    b) subdividing, by the processor, the component geometry into at least a first component layer and a second component layer lying thereon for the additive production, a second contour of the second component layer being nonidentical to a first contour of the first component layer;
    c) within a region of a melt bath of the first component layer, by the processor, gradually and continuously adapting without any jumps at least one production parameter for additive production of the second component layer from a value used in a first parameter set used in a region where the second component layer lies on the first component layer to a value used in a second parameter set used in a region where the second component layer does not lie on the first component layer, the at least one production parameter denoting a geometry of a contour irradiation pattern for the additive production of the component; and
    d) additively producing the component by selectively irradiating the powder layer utilizing the at least one production parameter;
    wherein a magnitude of the gradual and continuous adaptation of at least one production parameter is limited to the difference between the first parameter set and second parameter set.

2. The method according to claim 1, wherein the production parameter denotes at least one irradiation parameter for the additive production of the component, comprising a parameter selected from: radiation intensity, energy density, radiation power, radiation power density, irradiation wavelength.

3. The method according to claim 1, comprising:
continuous definition of a multiplicity of production parameters, comprising at least one parameter selected from: thermal input, melt bath width, beam offset, irradiation speed, size of a beam cross section on a powder bed, irradiation angle, flow rate or flow speed of a protective gas flow, states of gas valves regulating the protective gas flow, ambient pressure, alloy composition of a powder.

4. The method according to claim 1, wherein the second component layer comprises a region overhanging beyond the first component layer.

5. The method according to claim 4, wherein overhang production parameters, differing from a standard production parameter set, are assigned to the overhanging region.

6. The method according to claim 1, wherein the second component layer comprises a supported region, which lies inside the first contour of the first component layer and is separated therefrom.

7. The method according to claim 6, wherein support production parameters, differing from a standard production parameter set, are assigned to the supported region.

8. The method according to claim 1, wherein the component geometry is subdivided into a multiplicity of component layers arranged above one another, and
wherein production parameters of at least some of these component layers are defined continuously in the region of a melt bath of a contour of a respectively underlying component layer.

9. The method according to claim 8, wherein the component geometry is subdivided into between 1000 and 10000 component layers.

10. The method according to claim 1, wherein the method comprises a computer-implemented method for preparing the additive production of the component.

* * * * *